(12) United States Patent
Wilson et al.

(10) Patent No.: US 7,978,185 B2
(45) Date of Patent: Jul. 12, 2011

(54) CREATING VIRTUAL REPLICAS OF PHYSICAL OBJECTS

(75) Inventors: Andrew David Wilson, Seattle, WA (US); Daniel Chaim Robbins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/030,577

(22) Filed: Feb. 18, 2011

(65) Prior Publication Data

US 2011/0145706 A1 Jun. 16, 2011

Related U.S. Application Data

(63) Continuation of application No. 11/770,899, filed on Jun. 29, 2007, now Pat. No. 7,911,453.

(51) Int. Cl.
G06F 3/041 (2006.01)
(52) U.S. Cl. ......... 345/173; 345/156
(58) Field of Classification Search ......... 345/156, 345/173, 179; 341/27; 340/407.1; 434/113, 434/114
See application file for complete search history.

(56) References Cited

U.S. PATENT DOCUMENTS

| | | | | |
|---|---|---|---|---|
| 5,717,423 A * | 2/1998 | Parker | | 345/108 |
| 5,844,547 A * | 12/1998 | Minakuchi et al. | | 345/173 |
| 6,509,892 B1 * | 1/2003 | Cooper et al. | | 345/173 |
| 6,535,201 B1 * | 3/2003 | Cooper et al. | | 345/173 |
| 6,657,617 B2 * | 12/2003 | Paolini et al. | | 345/173 |
| 7,336,266 B2 * | 2/2008 | Hayward et al. | | 345/179 |
| 7,436,388 B2 * | 10/2008 | Hillis et al. | | 345/108 |
| 7,728,820 B2 * | 6/2010 | Rosenberg et al. | | 345/173 |
| 7,911,453 B2 * | 3/2011 | Wilson et al. | | 345/173 |
| 2004/0021698 A1 * | 2/2004 | Baldwin et al. | | 345/853 |
| 2008/0284726 A1 * | 11/2008 | Boillot | | 345/156 |
| 2009/0135162 A1 * | 5/2009 | Van De Wijdeven et al. | | 345/175 |
| 2009/0256933 A1 * | 10/2009 | Mizukami | | 348/240.1 |
| 2010/0046791 A1 * | 2/2010 | Glickman et al. | | 382/100 |

OTHER PUBLICATIONS

U.S. Appl. No. 11/770,899, Mail Date Aug. 4, 2010, Office Action.
U.S. Appl. No. 11/770,899, Mail Date Dec. 13, 2010, Notice of Allowance.

* cited by examiner

*Primary Examiner* — Ricardo L Osorio
(74) *Attorney, Agent, or Firm* — Workman Nydegger

(57) ABSTRACT

The present invention extends to methods, systems, and computer program products for creating virtual replicas of physical objects. A computer system detects that a portion of a physical object has come into the physical vicinity of a portion of a multi-touch input display surface. The computer system accesses object identifying data corresponding to the object. The computer system uses the object identifying data to access image data for the object from a repository of stored image data. The computer system uses the at least the accessed image data to generate a virtual replica of the object. The computer system presents the virtual replica of the object at a location on the multi-touch input display surface where the portion of the object was detected.

20 Claims, 3 Drawing Sheets

CREATING VIRTUAL REPLICAS OF PHYSICAL OBJECTS

CROSS-REFERENCE TO RELATED APPLICATIONS

This application is a continuation of, and claims priority to and the benefit of, U.S. patent application Ser. No. 11/770,899, filed on Jun. 29, 2007 and entitled "CREATING VIRTUAL REPLICAS OF PHYSICAL OBJECTS," which application is hereby expressly incorporated herein by this reference in its entirety.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

A variety of input devices including keyboards, mice, game controllers, touch pages, scanners, stylus, etc can be used to input data in a computer system. A scanner functions essentially the same as a copy machine to create a static digital representation of what is placed on the surface of the scanner. That is, the surface of an object is placed on the scanning surface of the scanner and optical components within the scanner sense and digitize the contents of the object surface. The digital representation can then be stored at, transferred to, etc., a computer system. Accordingly, a scanner is quite useful for creating digital representations of physical objects, such as, for example, documents, photographs, etc., that contain information on relatively flat surfaces.

In many computing environments, there is some ability to manipulate static digital representations of a document or photograph, such as, for example, using image editing, optical character recognition, etc. However, the static digital representations are typically just data and are not associated with any interactive behaviors.

Further, scanners generally have significantly reduced usefulness for scanning three dimensional objects with varied and different shapes. Since a scanner can only reproduce what is in contact with the scanning surface, a digital representation of only one side of the three dimensional object can be generated at a time. Typical scanners and related software do not include mechanisms to infer or access other data that can be used to more fully reproduce a digital representation of a three dimensional object from scanning a portion of the three dimensional object.

BRIEF SUMMARY

The present invention extends to methods, systems, and computer program products for creating virtual replicas of physical objects. A computer system detects that a portion of a physical object has come into the physical vicinity of a portion of a multi-touch input display surface. The computer system accesses object identifying data corresponding to the object. The computer system uses the object identifying data to access image data for the object from a repository of stored image data. The computer system uses the at least the accessed image data to generate a virtual replica of the object. The computer system presents the virtual replica of the object at a location on the multi-touch input display surface where the portion of the object was detected.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
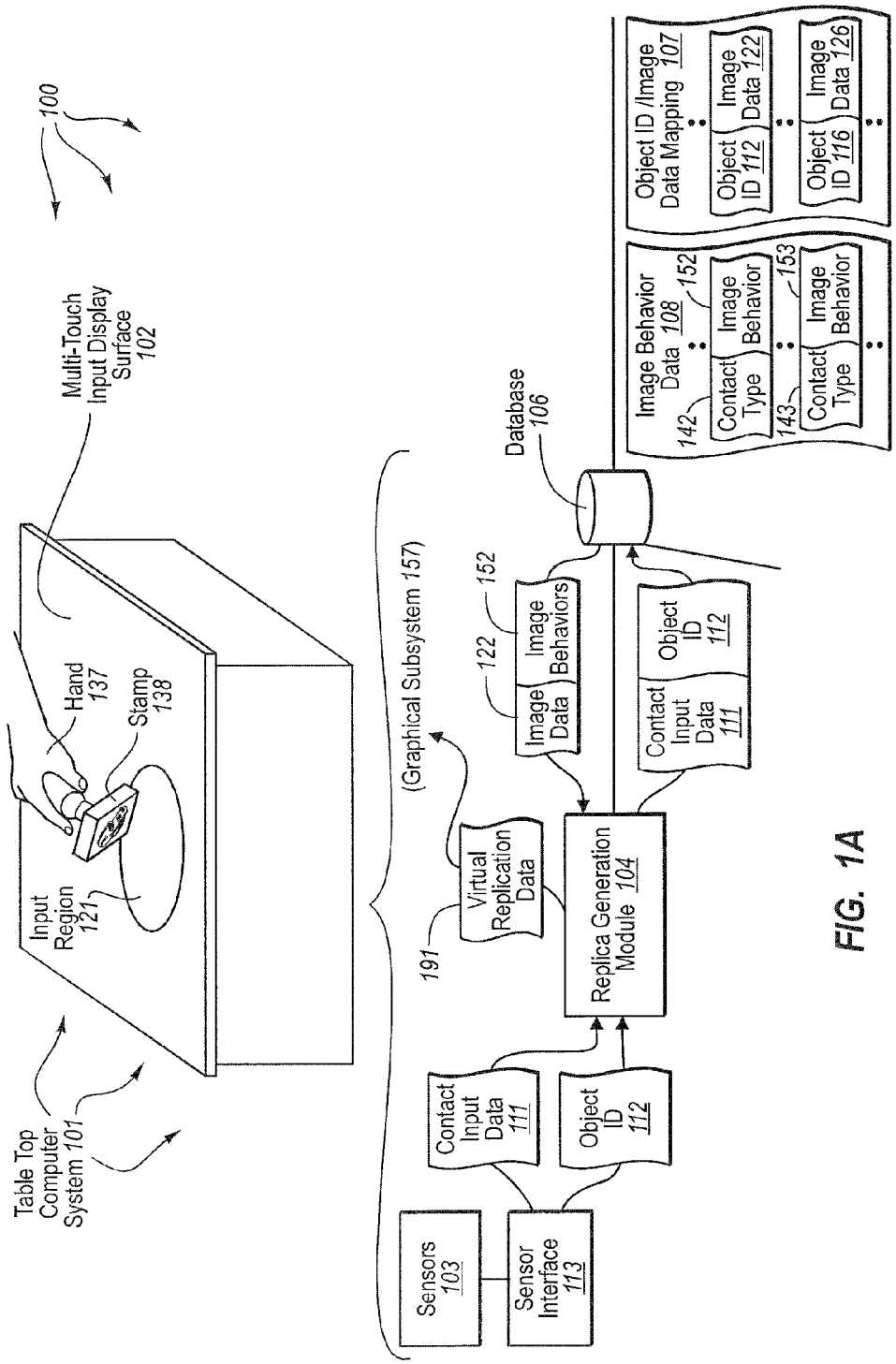
FIG. 1A illustrates an example computer architecture that facilitates creating virtual replicas of physical objects.

The present invention extends to methods, systems, and computer program products for creating virtual replicas of physical objects. A computer system detects that a portion of a physical object has come into the physical vicinity of a portion of a multi-touch input display surface. The computer system accesses object identifying data corresponding to the object. The computer system uses the object identifying data to access image data for the object from a repository of stored image data. The computer system uses at least the accessed image data to generate a virtual replica of the object. The computer system presents the virtual replica of the object at a location on the multi-touch input display surface where the portion of the object was detected.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

However, it should be understood, that upon reaching various computer system components program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Within this specification and following claims, "virtual replica" is defined as a virtual representation of some modification to, abstraction of, or interpretation of a real object. Although creation of an identical virtual copy of a real object is possible, there are also a variety of other possibilities. For example, through various graphical alterations (e.g., changing image data, adding image behaviors, such as, animation, etc), computer systems can create virtual representations based on a real object, but that are not necessarily identical to the real object.

FIG. 1A illustrates an example computer architecture 100 that facilitates creating virtual replicas of physical objects. Depicted in computer architecture 100 is table top computer system 101. Table top computer system 101 includes sensors 103, sensors interface 113, replica generation module 104, database 106, and graphical subsystem 157. Generally, the components of computer architecture 100, including sensors 103, sensors interface 113, replica generation module 104, database 106, and graphical subsystem 157, interoperate to implement various embodiments for creating virtual replicas of physical objects.

Table top computer system 101 can be connected to a network, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Sensors 103 can be configured to detect when a physical object (e.g., a bottle, a rubber stamp, a glass, a finger, a hat, etc.) has come into physical contact with or is at least within a specified physical proximity of a portion of the multi-touch input display surface 102. For example, sensors 103 can detect when a portion of rubber stamp 138 (a stamp of a car) has come in contact with multi-touch input display surface 102. Sensors 103 can be embedded in multi-touch input display surface 102 and can include for example, pressure sensors, temperature sensors, image scanners, barcode scanners, etc., that interoperate with sensor interface 113 to detect multiple simultaneous inputs.

In some embodiments, multi-touch input display surface 102 includes sensors for implementing a touch screen interface. For example, multi-touch input display surface 102 can include an interactive multi-touch surface. Thus, it may be that multi-touch input display surface 102 also functions as a presentation surface to display video output data to a user of table top computer system 101.

Sensors 103 can be included (e.g., embedded) in a plurality of locations across multi-touch input display surface 102. Sensors 103 can detect locations where physical contact with the multi-touch input display surface 102 has occurred. The density of sensors 103 can be sufficient such that contact across the entirety of touch input display surface 102 can be detected. Thus, sensors 103 are configured to detect and differentiate between simultaneous contact at a plurality of different locations on the multi-touch input surface 102

Sensors 103 can sample the entire surface of multi-touch input display surface 102 at specified intervals, such as, for example, 1 ms, 5 ms, etc. for detected contact. At each sampling interval, raw sensor data indicating the sampling results, including locations and/or area of any detected contact with multi-touch input surface 102, is sent to sensor interface 113. Thus, sensor output from sensors 103 can be raw sensor signal data indicating contact at one or more different locations and/or areas on multi-touch input display surface 102.

Sensor interface 113 can receive raw sensor signal data from sensors 103 and can convert the raw sensor signal data into contact input data (e.g., digital data) that can be compatibly processed by other modules of table top computer system 101. Sensor interface 113 or the other modules can buffer contact input data as needed to determine changes in contact on multi-touch input display surface 102 over time.

For example, raw sensor signal data from sensors 103 can change (e.g., between sampling intervals) as new contacts are detected, existing contacts are moved, and existing contacts are released on multi-touch input surface 102. Thus, upon receiving an indication of contact on multi-touch input display surface 102, sensor interface 113 can initiate buffering of raw sensor signal data (e.g., within a buffer in system memory of table top computer system 101). As contacts on multi-touch input display surface 102 change, sensor interface 113 can track the changes in raw sensor signal data and update locations and ordering of detected contacts within the buffer.

For example, sensor interface 113 can determine that contact was first detected at a location and then no contact was subsequently at the location (e.g., a user placed a rubber stamp on the surface and then removed it). Upon receiving an indication that contact is no longer detected in a particular location on multi-touch input display surface 102, sensor interface 113 can convert the contents of the buffer to contact input data (e.g., contact input data representing contact across a portion of multi-touch input display surface 102). Sensor interface 113 can then send the contact input data to other modules at table top computer system 101. Other modules can buffer the contact input data as needed to determine changes at a location over time.

Sensors interface 113 can also interoperate with sensors that are external to table top computer system 101 to detect a physical object. For example, detection mechanism 143 can interoperate with cameras, infrared sensors, bar code scanners, wireless communication modules, etc., physically located in an area surrounding (e.g., the same room with) table top computer system 101.

Thus, sensor interface 113 can interoperate with any of the described sensors to determine when an object is within a specified proximity of a component (e.g., a presentation surface) of table top computer system 101 or in physical contact with multi-touch input display surface 102. A specified physical proximity can be a specified number of inches or feet from table top computer system 101 or even just that a physical object is in the same room as table top computer system 101. For example, a physical object can be detected "hovering" above multi-touch input display surface 102 when it is relatively close to multi-touch input display surface 102 (but not necessarily in physical contact with multi-touch input display surface 102).

Sensor interface 113 can also be configured to interoperate with sensors individually or as subsets such that sensor interface 113 can differentiate locations where physical contact with and/or physical proximity to multi-touch input display surface 102 has occurred. Thus, sensor interface 113 can differentiate between detected physical contact and/or detected physical proximity at a plurality of different locations on multi-touch input display surface 102.

Further, sensor interface 113 can interoperate with any of the described sensors to receive object identifying information associated with a detected object. For example, sensors 103 can scan a bar code, detect a wireless device ID, detect the shape of a physical object, etc., to obtain object identifying information for a physical object. The object identifying information can then be forwarded to sensor interface 113.

In some embodiments, detecting contact or physical proximity to multi-touch input display surface 102 triggers a scan for associated object identifying information. For example, in response to one or more embedded pressure sensors detecting physical contact with a portion of the presentation surface, a Radio Frequency ("RF") scanner can then scan for RF tags attached to a contacting physical object. Thus, one sensor or subset of sensors can be used to detect physical contact with an object and another sensor or subset of sensors can be used to obtain object identifying information for the object.

In another detection example, after pressure sensors detect contact and/or optical sensors detect proximity, an image scanner can be used to scan the physical characteristics at and/or around the location of the physical contact or proximity detection. From the scanned data, sensors can obtain object identifying information. For example, if a rubber stamp is placed on (or is detected "hovering" above) multi-touch input display surface 102, a scanner can scan the bottom rubber stamp (e.g., the portion in contact with or hovering multi-touch input display surface 102) to generate scan data. The scanner can then send the scan data to sensor interface 113. Sensor interface 113 can convert the scan data into a digital format compatible with other modules of table top computer system 101.

Generally, replica generation module 104 is configured to receive input contact data and object identifying information for a physical object and generate a virtual replica of the physical object. Replica generation module 104 can communicate with database 106 to obtain data appropriate for creating a virtual replica of a physical object.

Database 106 includes object ID/image data mapping 107 and image behavior data 108. Object ID/image data mapping 107 includes a plurality of mapping elements, such as, for example, mapping elements 172 and 176, that map between object IDs (e.g., 112, and 116) and corresponding image data (e.g., 122 and 126 respectively). Thus, object ID/image data mapping 107 includes data that can be used to create a virtual replica for a physical object. Image data corresponding to an object ID can be images data for a detected physical object. For example, if a rubber stamp of a whale is detected in contact with multi-touch input display surface 102, image data for creating an image of a whale can be identified from within object ID/image data mapping 107.

Image behavior data 108 includes a plurality of mapping elements, such as, for example, mapping elements 182 and 183, that map types of contact (e.g., 142 and 143) to corresponding image behaviors (e.g., 152 and 53 respectively). Thus, image behavior data 108 includes data that can be used to create a virtual replica for a physical object. Different contact types (moving, dragging, touch an existing virtual replica, duration of contact, etc.) can correspond to different types of image behavior.

A variety of different images behaviors can be implemented. For example, a physical object (e.g., a rubber stamp) can be tracked over time as it is moved across multi-touch input display surface 102. Moving a physical object on multi-touch input display surface 102 can indicate that an animation behavior is to be applied a corresponding virtual replica. The animation can account for the position and orientation of the rubber stamp.

A physical object can be placed in contact with multi-touch input display surface 102 where a virtual replica of another physical object is already displayed. Placing a physical object in contact with a virtual replica on multi-touch input display surface 102 can indicate that a combine behavior is to be applied to the existing virtual replica and the virtual replica for the physical object.

A physical object can be tracked over time as it is dragged across multi-touch input display surface 102. Dragging a physical object on multi-touch input display surface 102 can result in creating multi copies of a virtual replica at discrete locations on multi-touch input display surface 102

The duration contact between a physical object and multi-touch input display surface 102 can be detected. Reduced contact time can result in a lighter colored virtual replica. On the other hand, increased contact time can result in a darker colored virtual replica.

Although not expressly depicted in computer architecture 100, database 106 can include modules for receiving queries, accessing data responsive to queries, and returning accessed data to the requesting computer systems. Replica creation module 104 can submit queries including an object ID and contact input data to database 106. Accordingly, database 106 can receive queries from replica creation module 104 for identifying image data corresponding to an object ID and for identifying image behavior data corresponding to detected contact. In some embodiments, replica creation module 104 submits a query that includes an object ID and contact input data and requests database 106 to return corresponding image data and image behavior data.

In response to such a request, database 106 can refer to object ID/image data mapping 107 and image behavior data 108. For a received object ID, database 106 can scan through mapping elements within Object ID/image data mapping 107. When the received object ID is identified within a mapping element, database 106 can access and return the corresponding image data from the mapping element. If the object ID is not identified, database 106 can indicate this to the requesting computer system. For a received contact input data, database 106 can scan through mapping elements image behavior data 108. When contact input data includes a type of contact, database 106 can access and return the corresponding image behavior data from the mapping element. Thus, in response to receiving an object ID and contact input data, database 106 can return image data and image data behavior for creating a virtual replica of a physical object.

Figure 1C:
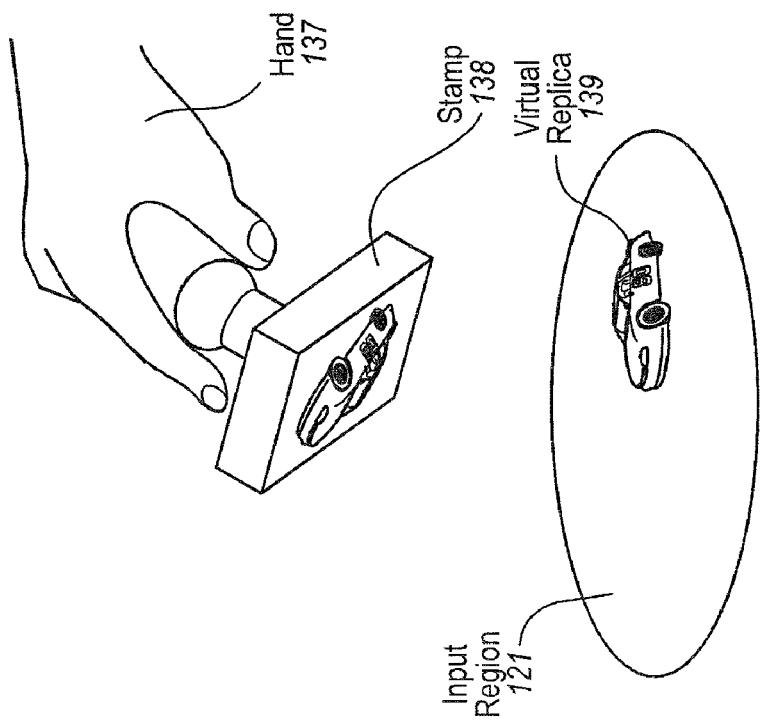
FIGS. 1B and 1C illustrates an expanded view of a portion of a multi-touch input display surface where a virtual replica of a physical object is created.
Figure 1B:
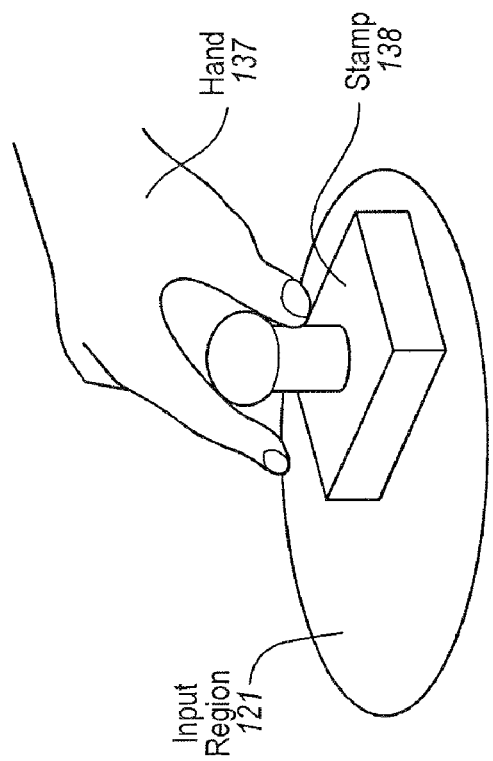
Figure 2:
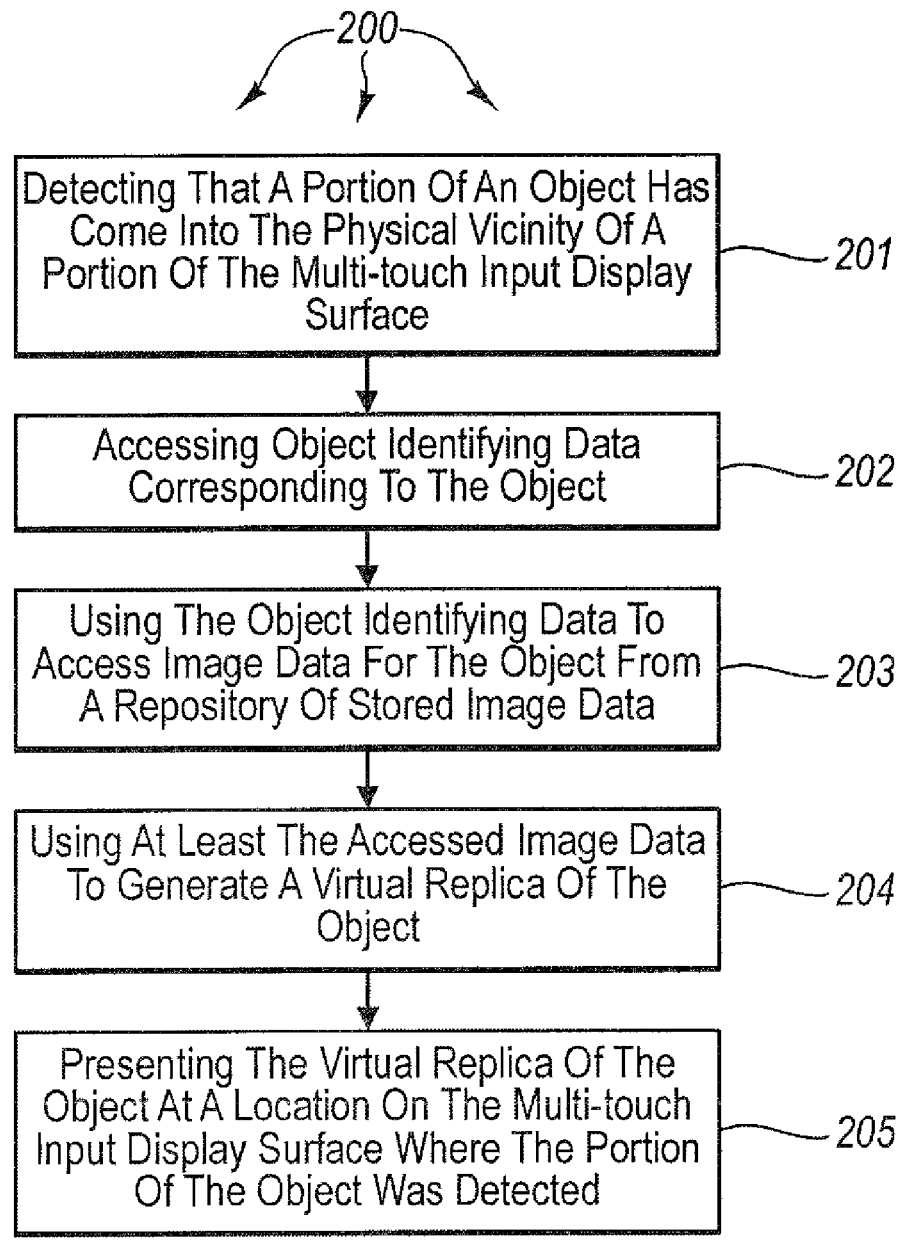
FIG. 2 illustrates a flow chart of an example method for creating a virtual replica of a physical object.

FIGS. 1B and 1C illustrates an expanded view of input region 121 where a virtual replica of a physical object is created. FIG. 2 illustrates a flow chart of an example method 200 for creating a virtual replica of a physical object. The method 200 will be described with respect to the components and data depicted in computer architecture 100.

Method 200 includes an act of detecting that a portion of an object has come into the physical vicinity of a portion of the multi-touch input display surface (act 201). For example, hand 137 (e.g., of a computer system user) can move rubber stamp 138 at least within a specified physical proximity and potentially in contact with multi-touch input display surface 102 at input region 121. Sensors 103 can detect that rubber stamp 138 is within the specified proximity of and/or in contact with multi-touch input display surface 102. An expanded view of contact between rubber stamp 138 and multi-touch input display surface 121 within input region 121 is depicted in FIG. 1B.

From any detected contact, sensor interface 113 can gather contact input data 111 and send contact input data 111 to replica creation module 104. Contact input data 111 can indicate how rubber stamp 138 was placed in contact with multi-touch input display surface 102, such as, for example, dragging, moving, contact duration, etc.

Method 200 includes an act of accessing object identifying data corresponding to the object (act 202). For example, sensors 103 can obtain object ID 112 for rubber stamp 138. Object ID 112 can be obtained from a bar code (e.g., affixed to rubber stamp 138), a visual code (e.g., a reduced size picture of the rubber stamp 138 affixed to the rubber stamp 138), a wireless ID (e.g., of transmitter in rubber stamp 138), etc., associated with rubber stamp 138. Sensor interface 113 can send object ID 112 to replica creation module 104.

Method 200 includes an act of using the object identifying data to access image data for the object from a repository of stored image data (act 203). For example, replica creation module 104 can submit object ID 112 in a query to database 106. Database 106 can scan object ID/Image data mapping 107 for mapping elements that include object ID 112. Thus, it may be that database 106 identifies mapping element 172. From identified mapping elements, database 106 can return corresponding image data. For example, database 106 can access image data 122 (for rubber stamp 138) and send image data 122 to replica creation module 104

Replica creation module 104 can also submit contact input data 111 in a query to database 106. Database 106 can scan image behavior data 108 to identify any types of contact indicated in contact input data 112. For example, if it may be that database 106 identifies mapping element 182 (e.g., corresponding to movement of rubber stamp 138 on the multi-touch input display surface 102). From identified mapping elements, database 106 can return corresponding image behavior data. For example, database 106 can return image behavior data 152 (e.g., an animation behavior) and send image behavior data 152 to replica creation module 104.

Method 200 includes an act of using at least the accessed image data to generate a virtual replica of the object (act 204). For example, replica creation module 104 can use image data 122, potentially along with image behavior data 152, to create a virtual replica data 191 (for a virtual replica of rubber stamp 138). Image data 122 can be used to create a visual image of rubber stamp 138. When appropriate, image behaviors from image behavior data 152 can be applied to manipulate the visual image of rubber stamp 138.

Method 200 includes an act of presenting the virtual replica of the object at a location on the multi-touch input display surface where the portion of the object was detected (act 205). For example, replicate creation module 104 can send virtual replica data 191 to graphical subsystem 157. Referring now to FIG. 1C, graphical subsystem 157 can process virtual replica data 191 (of a car) to create virtual replica 139 (of the car). Graphical subsystem 157 can apply any appropriate image behaviors to virtual replica 139 as indicated in image behavior data 152. For example, graphical subsystem 157 can animate virtual replica 139, make virtual replica 139 lighter or darker, make virtual replica 139 drive away, etc.

Presented replicas can also exhibit additional behaviors after presentation. For example, virtual replica 139 can be selected and subsequent moved to a different location on multi-touch input display surface. Virtual replica 139 can also be combined with other virtual replicas, for example, to build other virtual objects. Various different types of objects can also exhibit replica specific behavior, such as, for example, a replica of a fish can swim, a replica of a dog can bark, a replica of a star can twinkle, etc. Accordingly embodiments of the present invention facilitate the creation of relatively complex and interactive virtual replicas of physical objects.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer implemented method, which is implemented at a computer system having at least one processor in communication with a multi-touch input display surface, for virtually replicating a physical object at the multi-touch input display surface, the method comprising:
    an act of the computing system detecting that a portion of a physical object has come within the physical vicinity of a portion of the multi-touch input display surface and prior to the physical object coming in contact with the multi-touch input display surface;
    an act of accessing object identifying data corresponding to the physical object;
    an act of using the object identifying data to access image data for the physical object from a repository of stored image data;
    an act of using at least the accessed image data to generate a virtual replica of the physical object; and
    an act of presenting the virtual replica of the physical object at a location on the multi-touch input display surface prior to the physical object coming in contact with the multi-touch input display surface.

2. The method of claim 1, wherein the physical vicinity is a predetermined distance.

3. The method of claim 2, wherein the predetermined distance is a predetermined number of inches.

4. The method of claim 2, wherein the predetermined distance is a predetermined number of feet.

5. The method of claim 1, wherein the physical vicinity is predetermined to be a physical vicinity within a same room.

6. The method of claim 1, wherein the physical vicinity is predetermined to be a vicinity in which the physical object hovers over the multi-touch input display surface.

7. The method as recited in claim 1, wherein the act of detecting that the portion of the physical object has come into the physical vicinity of the portion of the multi-touch input display surface prior to the physical object coming in contact with the multi-touch input display surface comprises at least one of detecting a wireless identifier for the physical object or scanning a code attached to the physical object when the physical object comes within the physical vicinity of a portion of the multi-touch input display surface.

8. The method as recited in claim 7, wherein the act of detecting that the portion of the physical object has come into the physical vicinity of the portion of the multi-touch input display surface comprises detecting a wireless identifier for the physical object.

9. The method as recited in claim 7, wherein the act of detecting that the portion of the physical object has come into the physical vicinity of the portion of the multi-touch input display comprises scanning the code attached to the physical object.

10. The method as recited in claim 1, wherein the act of accessing object identifying data corresponding to the physical object includes scanning a code attached to the physical object.

11. The method as recited in claim 1, wherein the act of accessing object identifying data corresponding to the physical object comprises an act of detecting a wireless identifier for the object.

12. The method of claim 1, wherein the method further includes displaying the virtual replica of the physical object at the location of the multi-touch input display surface proximate a location where the physical object is detected to be within the physical vicinity of.

13. The method of claim 1, wherein the method includes using a first sensor to detect the physical vicinity of the physical object and a second sensor is used to detect the object identifying data.

14. The method as recited in claim 1, wherein the act of using the object identifying data to access image data for the object from a repository of stored image data comprises:
    an act of submitting a query to a database, the query including the object identifying data for the physical object; and
    an act of receiving a response from the database, the response including a corresponding image data for creating a virtual replica of the physical object.

15. The method as recited in claim 1, further comprising:
    subsequent to the act of presenting the virtual replica of the physical object at a location on the multi-touch input display surface, an act of detecting a contact of the physical object with the multi-touch input display surface.

16. The method as recited in claim 1, wherein presenting the virtual replica includes animating the virtual replica based on image behavior data associated with the physical object and by at least applying the image behaviors to the virtual replica.

17. The method as recited in claim 1, wherein the act of presenting the virtual replica of the physical object at a location on the multi-touch input display surface comprises an act of presenting multiple copies of the virtual replica on the multi-touch input display surface.

18. A computer storage device having stored computer-executable instructions that, when executed at a processor of a computing system that is in communication with a multi-touch input display surface of the computing system, cause the computing system to perform a method that includes:
    using a first sensor to detect that a portion of a physical object has come within the physical vicinity of a portion of the multi-touch input display surface and prior to the physical object coming in contact with the multi-touch input display surface;
    accessing object identifying data corresponding to the physical object with a second sensor;
    using the object identifying data to access image data for the physical object from a repository of stored image data;
    using at least the accessed image data to generate a virtual replica of the physical object; and
    presenting the virtual replica of the physical object at a location on the multi-touch input display surface prior to the physical object coming in contact with the multi-touch input display surface.

19. The computer storage device of claim 18, wherein the method further includes combining the virtual replica with at least one other virtual replica to create a new virtual replica.

20. A computer system, comprising:
    at least one processor;
    a first sensor configured to detect a proximity of a physical object;

a second sensor configured to detect object identifying data associated with the physical object;

a multi-touch input display surface;

system memory; and stored computer-executable instructions which, when executed by the at least one processor, implement a method for creating a virtual replica of the physical object at the multi-touch input display surface, the method comprising:

detecting that a portion of a physical object has come within the physical vicinity of a portion of the multi-touch input display surface with the first sensor and prior to the physical object coming in contact with the multi-touch input display surface;

accessing object identifying data corresponding to the physical object with the second sensor;

using the object identifying data to access image data for the object from a repository of stored image data;

using at least the accessed image data to generate a virtual replica of the physical object; and presenting the virtual replica of the physical object at a location on the multi-touch input display surface prior to the physical object coming in contact with the multi-touch input display surface.

\* \* \* \* \*